United States Patent [19]

Lozowick et al.

[11] Patent Number: 5,228,083
[45] Date of Patent: Jul. 13, 1993

[54] CRYPTOGRAPHIC PROCESSING IN A COMMUNICATION NETWORK, USING A SINGLE CRYPTOGRAPHIC ENGINE

[75] Inventors: Philip P. Lozowick, Jerusalem; Siman-Tov Ben-Michael, Girat Zeer, both of Israel

[73] Assignee: Digital Equipment Corporation, Maynard, Mass.

[21] Appl. No.: 960,308

[22] Filed: Oct. 13, 1992

Related U.S. Application Data

[63] Continuation of Ser. No. 722,745, Jun. 28, 1991, abandoned.

[51] Int. Cl.$^5$ ............................................. H04L 9/00
[52] U.S. Cl. ............................................ 380/9; 380/21
[58] Field of Search ................................ 380/9, 21, 50

[56] References Cited

U.S. PATENT DOCUMENTS

| | | | |
|---|---|---|---|
| 4,353,126 | 10/1982 | Bergmann | 380/9 |
| 4,811,392 | 3/1989 | Marzolini | 380/9 |
| 4,815,128 | 3/1989 | Malek | 380/9 |
| 4,881,263 | 11/1989 | Herbison et al. | 380/21 |
| 4,893,340 | 1/1990 | Lubarsky et al. | 380/50 |
| 4,907,275 | 3/1990 | Hashimoto | 380/50 |
| 4,920,567 | 4/1990 | Malek | 380/9 |
| 4,924,513 | 5/1990 | Herbison et al. | 380/21 |
| 4,941,143 | 7/1990 | Twitty et al. | 370/85.2 |
| 4,961,221 | 10/1990 | Abiven | 380/21 |
| 4,969,147 | 11/1990 | Markkula, Jr. et al. | 370/94.1 |
| 5,003,593 | 3/1991 | Mihm, Jr. | 380/21 |

Primary Examiner—Salvatore Cangialosi
Attorney, Agent, or Firm—Barry N. Young; A. Sidney Johnston

[57] ABSTRACT

A device and related method for cryptographically processing data packets being forwarded in both directions between a communication network and a client interface, using only a single cryptographic engine, but without any degradation in latency or throughput performance, as compared with a device using two cryptographic engines Outbound data packets received from the client interface are immediately parsed to determine if cryptographic processing is required, and an appropriate portion of each packet may be cryptographically processed as the packet is received and stored in an outbound buffer memory, until forwarded onto the communication network. Inbound data packets received from the communication network are not immediately parsed but are stored in an inbound buffer memory until the client interface is available. Parsing and any needed cryptographic processing of an inbound packet is not performed until the client interface becomes available and the packet is retrieved from the inbound buffer memory for forwarding. Since the client buffer cannot receive an inbound packet at the same time that it is sending an outbound packet, the single cryptographic engine serves to process traffic in both directions.

13 Claims, 3 Drawing Sheets

CRYPTOGRAPHIC PROCESSING IN A COMMUNICATION NETWORK, USING A SINGLE CRYPTOGRAPHIC ENGINE

This application is a continuation of Ser. No. 07/722,745 filed Jun. 28, 1991, now abandoned.

BACKGROUND OF THE INVENTION

This invention relates generally to cryptographic processing in communication networks and, more particularly, to a cryptographic device located between a user or "client" interface, which is usually a network of relatively local computers and other devices, and a communication network through which messages are to be transmitted from the client interface to selected destinations. Since many other systems and clients have legitimate access to the communication network, the security of these transmissions is often a significant issue. Various communication security protocols have been developed, for operation at different network protocol layers. The precise nature of these security protocols is not important to the present invention, which may be adapted to handle any desired security protocol.

The principal types of security service with which the invention is concerned involve encryption for confidentiality and encryption for integrity. Confidentiality is the protection of transmitted information from disclosure to unauthorized individuals or entities. For this purpose the information is transformed into an encrypted form before transmission, and is decrypted back to its "clear text" form upon receipt at the destination. Integrity involves the detection of whether received data has been modified during transmission. For this purpose, the information need not be encrypted, but merely subject to processing that results in the generation of a unique cryptographic checksum at each end of the transmission path. If the checksums do not match, the underlying data is assumed to have been modified.

Ideally, cryptographic processing should be "transparent" to the user or client. Sending and receiving messages could then take place without regard to the nature, or even the existence, of cryptographic processing, the use of which should not significantly increase the transmission time delay, referred to as "latency," or have any significant effect on the "throughput" or rate of flow of data between the client and a network. However, completely transparent cryptographic processing is both complex and costly, and there is a need for a less costly nontransparent cryptographic processing technique, in which each participating device connected to a client interface assumes responsibility for some aspects of cryptographic processing.

An important goal in designing cryptographic systems for network use is that the cryptographic processing should be located between the client interface and the communication network, in such a manner that processing can be performed "on the fly" without significant delay, as data packets pass in either direction. In some configurations, cryptographic processing may be integrated with a client interface controller, but cryptographic processing is still being performed in the communication path. Because data has to be processed in both directions through the cryptographic device, most prior implementations of such a device employ two independent cryptographic engines, to handle the eventuality of data flow in both directions simultaneously. The use of a single cryptographic engine is commonly believed to affect performance adversely, by the injection of processing delays in one direction or the other.

Accordingly, there is still a need for improvement in the field of cryptographic processing for network communication, and in particular there is a need for a low-cost device, i.e. one needing only a single cryptographic engine, that does not suffer from the performance degradation of its predecessors. The present invention satisfies this need.

SUMMARY OF THE INVENTION

The present invention resides in a cryptographic processing device, and related method, providing a cryptographic interface between a communication network and a half-duplex client interface, using only a single cryptographic engine, but without any adverse effects on the throughput or latency in communication, as compared with a device using two cryptographic engines. Briefly, and in general terms, the method of the invention comprises the steps of cryptographically processing, if necessary, outbound data packets as they are received from the client interface, cryptographically processing, if necessary, inbound data packets as they are transmitted onto the client interface, and storing inbound and outbound data packets in temporary buffer storage, as needed, before forwarding. In most cases, data packets will be immediately forwarded, in what is referred to as "cut-through" operation. Only a single cryptographic engine is needed because the client interface is of a type that cannot handle an outbound packet and an inbound packet at the same time.

Further steps of the method include parsing each outbound data packet immediately prior to cryptographic processing, to determine whether processing is necessary and the type of processing to be performed, and parsing each inbound data packet immediately prior to cryptographic processing, to determine whether processing is necessary and the type of processing to be performed. The step of storing inbound and outbound packets in temporary buffer storage includes storing inbound packets in an inbound buffer memory if the client interface is unavailable, and storing outbound packets in an outbound buffer if the communication network is unavailable.

The method of the invention may also include the steps of receiving a loopback packet from the client interface, immediately parsing and cryptographically processing the loopback packet, if necessary, and storing the loopback packet in a loopback buffer memory until the client interface is available.

Stated in still more specific terms, the method of the invention comprises the steps of receiving inbound data packets from a communication network, determining whether a client interface is available and, if not, storing each inbound data packet in an inbound buffer memory. Then, when the client interface becomes available, the method includes the step of retrieving a stored data packet. The method further includes the steps of parsing the packet to determine whether it should be cryptographically processed, cryptographically processing the data packet if necessary, and transmitting the packet onto the client interface. For traffic in the other direction, the method includes the steps of receiving outbound data packets from the client interface, parsing each packet as it is received from the client interface, cryptographically processing each packet received from the client interface if processing is determined to be necessary, and determining whether the communication network is available. If the network is unavailable, the method includes storing each outbound data packet and, when the network becomes available, retrieving the data packet. The final step of the method is transmitting the outbound packet onto the communication network.

A single cryptographic engine is sufficient to perform both the steps of cryptographically processing the data, because cryptographic processing of outbound packets is performed as the packets are received from the client interface, and processing of inbound packets is performed as the packets are transmitted to the client interface. Half-duplex operation of the client interface precludes the possibility of both these functions being required at the same time.

For processing loopback packets, the method includes the steps of receiving a loopback packet from the client interface, immediately parsing and cryptographically processing the loopback packet, if necessary, and storing the loopback packet, if the client interface is unavailable.

In accordance with another aspect of the invention, the method further comprises the steps of parsing a portion of an inbound data packet before the client interface becomes available, storing the parsed portion of the packet in a first-in-first-out buffer, to be ready to transmit, retrieving data from the first-in-first-out buffer when the client interface becomes available, and beginning transmission of the retrieved data onto the client interface while additional data of the same packet is stored in and retrieved from the first-in-first-out buffer. Use of the first-in-first-out buffer ensures that transmission onto the client interface begins without delay as soon as the interface becomes available.

In terms of novel apparatus, the present invention includes, in its broadest terms, a single cryptographic engine, for cryptographically processing, if necessary, outbound data packets as they are received from the client interface and, if necessary, inbound data packets as they are transmitted onto the client interface, and buffer storage means for storing, as needed, inbound and outbound data packets before forwarding. As indicated above, a single cryptographic engine is sufficient for this purpose because the client interface cannot handle an outbound packet and an inbound packet at the same time. The apparatus of the invention may further include means for storing a loopback data packet, and may be defined in other more specific terms, comparable in scope with various forms of the method of the invention outlined above.

It will be appreciated from the foregoing that the present invention represents a significant advance in the field of cryptographic processing for use in network communication. In particular, the invention provides for bidirectional cryptographic processing between a communication network and a client interface using a single cryptographic engine, but without any degradation in throughput or latency time as compared with a device using two cryptographic engines. Other aspects and advantages of the invention will become apparent from the following more detailed description, taken in conjunction with the accompanying drawings.

DESCRIPTION OF THE PREFERRED EMBODIMENT

Figure 1:
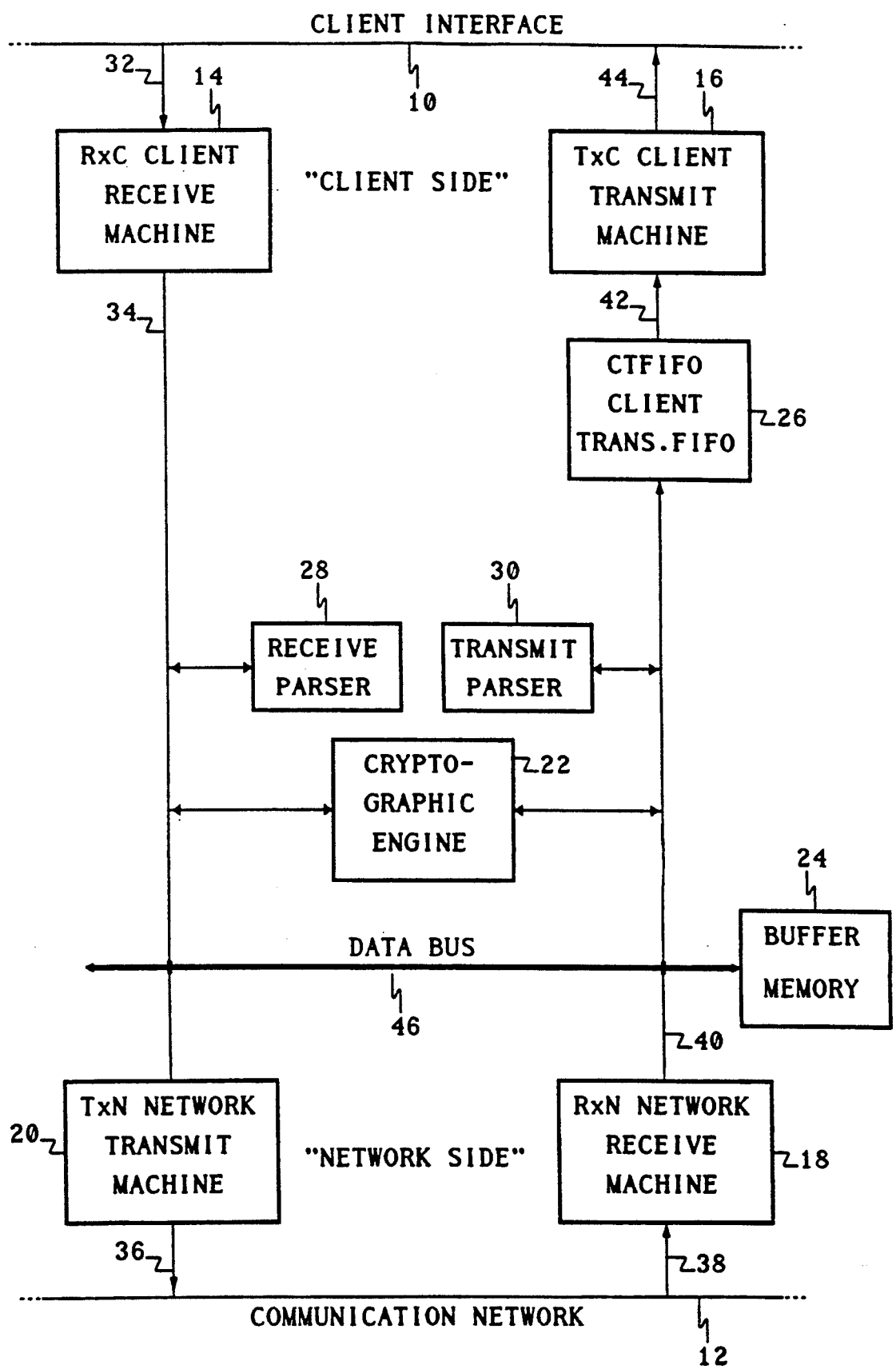
FIG. 1 is a block diagram showing the cryptographic device of the invention, connected between a client interface and a communication network, and having only one cryptographic engine.

As shown in the drawings by way of example, the present invention is concerned with a device for cryptographically processing data packets passing in both directions between a client interface and a communication network. In the past, it has been thought to be necessary to include at least two independently operating cryptographic engines in the device, to efficiently handle traffic in both directions with a minimum of delay. Prior to the present invention, the use of a single cryptographic engine has been thought to necessarily result in some kind of performance degradation, either in latency or throughput.

In accordance with the invention, a single cryptographic engine is used for cryptographic processing in both directions between the client interface and the communication network, without significant effect on latency or throughput of the device. Although this goal may seem impossible to achieve with a single cryptographic engine, it proves to be possible if the protocol used for access to the communication medium in the client interface is a half-duplex medium, such as Ethernet, employing a protocol commonly referred to as Carrier Sense Multiple Access with Collision Detection (CSMA/CD). Under the CSMA/CD rules for access to a network bus or cable, any station wishing to transmit must first "listen" to make sure that the cable is clear before beginning to transmit. All stations on the network have equal priority of access and may begin transmitting as soon as the line is clear and any required inter-packet delay has elapsed. However, if a first station that has started transmitting detects a "collision" with a transmission from another station, the first station continues transmitting for a short time to make sure that all stations wishing to transmit will detect the collision. Then the first station terminates transmission for some random period of time. Other stations involved in the collision do the same thing, also selecting a random, and therefore usually different, delay time before trying transmission again.

The nature of the CSMA/CD rules for network access are such that full-duplex transmission, i.e. transmitting and receiving at the same time, is not possible. If a station is receiving a message, the network is busy and a transmission cannot be started, from this or any other station. Similarly, if a transmission is in progress from this station, no message can be received at the same time, since no other sending station can gain access to the network while this station is sending a message. Therefore, the nature of operation of an Ethernet or other CSMA/CD station is half-duplex, i.e. messages can be both transmitted and received, but because of the nature of the network access rules, not at the same time. This characteristic of Ethernet and CSMA/CD is used in the present invention, specifically in the client interface, to provide bidirectional transmission of messages through a single cryptographic engine, without any degradation in latency or throughput as compared with a device using two cryptographic engines. It will be apparent, however, that the invention is not limited to use with CSMA/CD, and will operate equally well with any half-duplex communication medium.

FIG. 1 shows the device of the invention in simplified block diagram form, connected between a client interface, indicated by reference numeral 10, and a communication network 12. In this specification, aspects of the device relating to the client interface are sometimes referred to as being on the "client side" of the device, and aspects relating to the communication network are sometimes referred to as being on the "network side." The relevant components of the device include a client receive machine 14, designated RxC, a client transmit machine 16, designated TxC, a network receive machine RxN 18, a network transmit machine TxN 20, a single cryptographic engine 22, a buffer memory 24, a client transmit FIFO memory 26, a receive parser 28 and a transmit parser 30.

These components are connected in various logical configurations depending on the type of traffic being handled at a particular time. Although all of the data paths to be described pass through the buffer memory 24, there are two direct logical paths that make use of the buffer memory as part of each data path, and not for data packet storage. First, there is a direct logical path from the client interface 10 to the network cable 12. This path includes a line 32 from the client interface 10 to the client receive machine 14, a line 34 from the client receive machine to the network transmit machine 20 (by way of the buffer memory 24), and a third line 36 from the network transmit machine to the network cable 12. Similarly, there is another direct logical path from the communication network 12 to the client interface 10, including a line 38 from the communication network to the network receive machine 18, a line 40 from the network receive machine to the client transmit FIFO memory 26 (by way of the buffer memory 24), another line 42 from the FIFO memory to the client transmit machine 16, and a further line 44 from the client transmit machine to the client interface 10. The buffer memory 24, which is actually three logically separate memories, is connected by a data bus 46 to the "outbound" data path along line 34, and to the "inbound" data path along line 40.

It will be understood from the foregoing description of data paths that the buffer memory 24 serves both to store data packets when they can not be immediately transmitted, and to pass data immediately, without storing the entire packet. While both these actions might technically involve "storing" data in the memory, in this specification the word "storing" is reserved for the situation in which an entire data packet is held for later forwarding onto the communication network or the client interface. When a data packet passes through the buffer memory in a "cut-through" mode of operation, a packet is already being transmitted from the memory while portions of it are still arriving at the memory.

Figure 2:
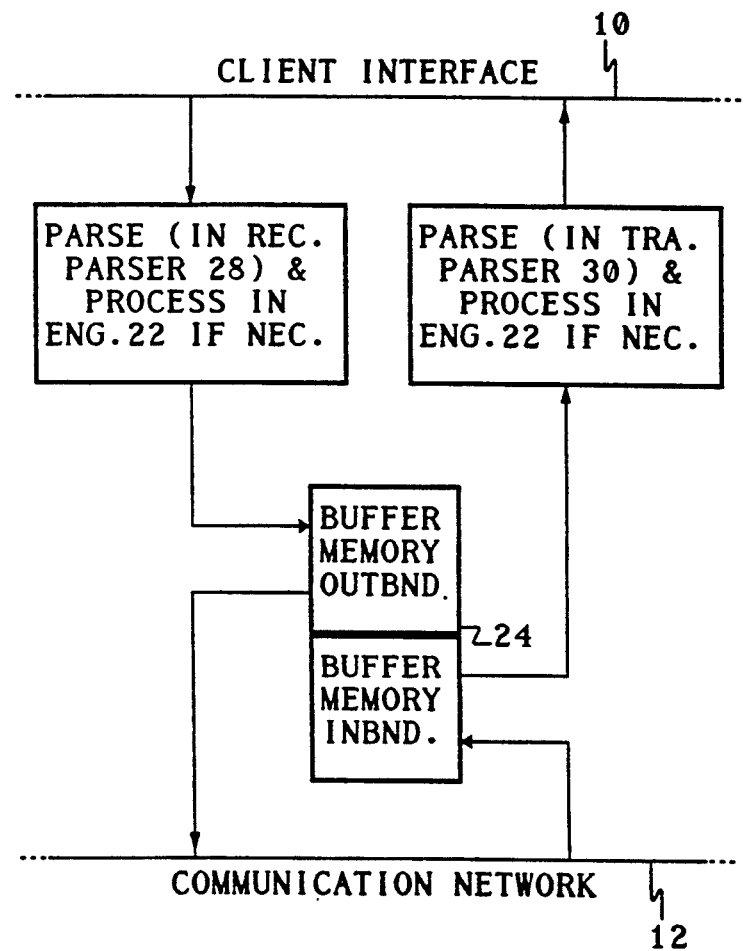
FIG. 2 is a simplified block diagram similar to FIG. 1.

The key to apparently simultaneous processing of bidirectional traffic is best explained with reference to the data flow diagram of FIG. 2. A data packet received from the client interface 10 is always parsed as it is received, by the receive parser 28, and is cryptographically processed by the engine 22 if this is determined to be necessary from the parsing processing in the receive parser 28. Then, the data packet, whether or not encrypted, is stored in the buffer memory 24 as long as is necessary to wait for access to the communication network 12. In contrast, a data packet received from the communication network 12 is not immediately parsed or cryptographically processed, but is directed first to the buffer memory 24 for temporary storage. Normally, the client interface will be available, and the packet will be immediately retrieved from the buffer memory. In fact the packet will normally be transmitted to the client interface while it is still being received from the communication network 12. This is known as "cut-through" operation, as contrasted with "store-and-forward" operation, when the entire packet is left in temporary storage if the client interface is unavailable. In any event, when the client interface is available, or later becomes available, the packet is fed from the buffer memory 24, is parsed by the transmit parser 30, is cryptographically processed by the engine 22, if needed, and eventually is forwarded onto the client interface 10. The cryptographic engine 22, when its use is called for, is going to be either processing a data packet that is being received from the client interface 10, or processing a data packet that is being transmitted to the client interface. These two functions of the engine 22 can never be required at the same time because parsing and possible cryptographic processing of the outbound packet would not be started if the client interface were already busy delivering a data packet to the device.

More specifically, a data packet received from the communication network 12 by the network receiver 18 is passed directly to the buffer memory 24. If there is currently no packet being transmitted or received on the client interface 10, the packet is passed to the client transmit FIFO memory 26 and, in parallel, is parsed by the transmit parser 30. If necessary, from the appropriate byte, as determined by the parser, the data is passed through the cryptographic engine 22 before being passed to the client transmit FIFO memory 26. Finally, the client transmit machine 16 draws data from the client transmit FIFO memory 26 and transmits a data packet onto the client interface 10.

When a packet received from the communication network 12 enters the buffer memory 24, if there is currently a packet being received from the client network 10, but there are no pending packets to be transmitted to the client interface, the beginning portion of the packet will be transferred to the client transmit FIFO memory 26 as though it were about to be transmitted, and parsing of the beginning portion will be performed. However, no cryptographic processing will be started, and the client transmit machine 16 will not draw data from the client transmit FIFO memory 26 because the client interface will be seen to be still busy. When the client transmit FIFO memory becomes full, no more data will be transferred until the actual transmission begins and the client transmit machine 16 begins drawing data from the client transmit FIFO memory. This preloading of the FIFO memory ensures that the device can meet a required interpacket gap between receptions and transmissions on the client interface, and that no unnecessary latencies are incurred. The FIFO memory ensures that there is no "underrun" of data being transmitted when the cryptographic engine 22 begins operating and until it processes the first block of data and the engine's "pipeline" of data reaches a steady state.

Figure 3:
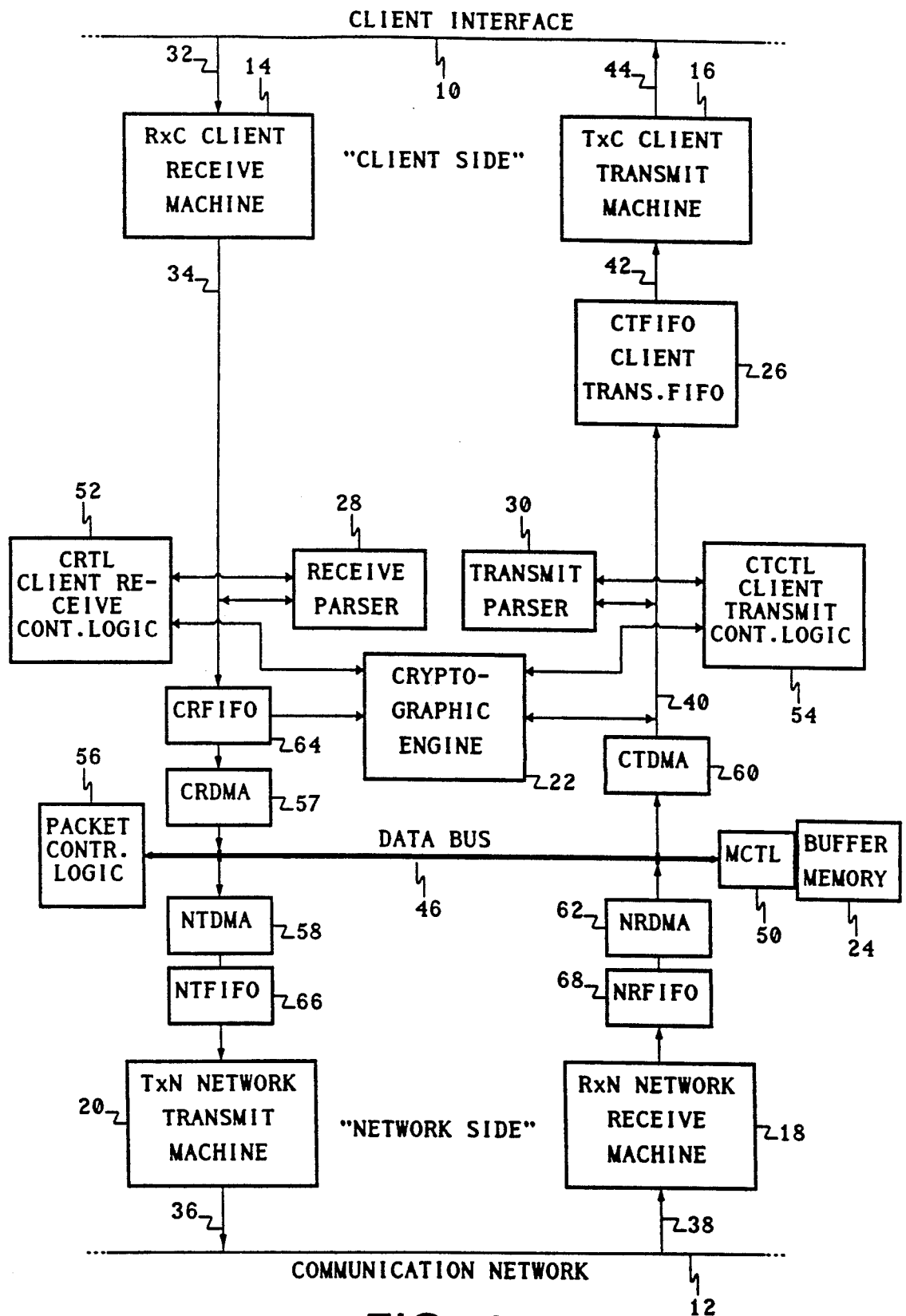
FIG. 3 is a more detailed block diagram similar to FIGS. 1 and 2.

FIG. 3 shows the device of the invention in more detail. Components shown in FIG. 3 but not in the simplified diagrams of FIGS. 1 and 2, include a memory controller 50 to control the buffer memory 24, client receive control logic (CRCTL) 52, client transmit control logic (CTCTL) 54, packet control logic 56, four direct memory access units (CRDMA 57, NTDMA 58, CTDMA 60 and NRDMA 62), and three additional FIFO memories (CRFIFO 64, NTFIFO 66 and NRFIFO 68). The functions of these additional components will now be briefly explained.

The client receive control logic CRCTL 52 controls receive operations on the client side of the device, including coordination of operations of the receive parser 28 and the cryptographic engine 22. The client transmit control logic CTCTL 54 controls transmit operations on the client side of the device, including coordination of operations of the transmit parser 30 and the cryptographic engine 22. The additional FIFO memories 64, 66, 68 are relatively small memories, the primary purpose of which is to provide buffers for efficient operation of the data bus 46. The DMA units 57, 58, 60, 62 provide a conventional DMA function to access the buffer memory 24. The memory controller 50 directs buffer memory operations and related operations on the data bus 46. Finally, the packet control logic 56 regulates data flow to and from the client and network sides of the device, in such a manner as to minimize data buffering requirements.

For outbound data flow, from the client side to the network side of the device, parsing is performed (in the receive parser 28) on an incoming data packet at the same time that the packet is being transferred over the data bus 46 to the buffer memory 24. When the receive parser 28 detects that cryptographic processing is required on the packet, the parser notifies the client receive control logic CRCTL 52, which, at an appropriate time, begins directing data from the client receive machine 14 into the cryptographic engine 22. After cryptographic processing, the data packet is stored in the buffer memory 24. When the network side of the device is able to accept a data packet, based on the availability of the network, the packet control logic 56 directs the network transmit machine 20 to begin transmitting, and data will transfer from the buffer memory 24 to the network transmit machine and out onto the communication network. This operation, which is referred to as cut-through, can take place simultaneously with continuing reception of data from the client side of the device.

Inbound data flow, from the network side to the client side of the device, is not immediately parsed, but is transferred directly from the network receive machine 18 to the buffer memory 24. When the client side of the device becomes available, the packet control logic 56 instructs the client transmit control logic 54 to begin transmitting to the client, and this operation can take place simultaneously with reception of data from the network side. As a packet of data is being sent to the client transmit FIFO 26, it is simultaneously parsed by the transmit parser 30. Once the transmit parser 30 detects that a cryptographic operation is required, it notifies the client transmit control logic 54, which directs data flow, at an appropriate time, through the cryptographic engine 22, from which the data packet flows through the client transmit FIFO 26 and onward to the client interface.

In addition to inbound data packets and outbound data packets, the device also handles loopback data packets, which are packets of data received from and returned to the client side of the device, usually after cryptographic processing. A loopback function is provided to client devices to permit "local" cryptographic processing of data packets. Loopback operation provides cryptographic services, such as file encryption to the client. The loopback function will also be needed, for example, if an inbound packet of data is inadvertently decrypted when it should not have been, or if an inbound packet should have been decrypted but was not. Basically, the loopback function provides client access to cryptographic processing of data packets that are not outbound packets. Loopback packets received from the client side of the device are handled in much the same way as outbound packets. They are parsed on their way to the buffer memory 24, but are stored in a loopback buffer of the buffer memory, instead of an outbound buffer. When it is time to send the loopback packet back to the client, i.e. when the client side is available and it is the loopback packet's turn to be transmitted, the packet is sent directly back to the client, with no additional processing.

The specific parsing procedures followed in the receive parser 28 and the transmit parser 30 are highly dependent on network protocols and specific data packet formats employed, and are not considered to be part of the present invention. Parsing simply involves scanning header information in a data packet to determine whether cryptographic processing is needed for the packet. The client device is required to indicate in the header whether or not cryptographic processing is required. When the receive parser 28 detects a header field that indicates cryptographic processing is required, an appropriate part of the data packet is diverted through the cryptographic engine 22. The parser 28 may be designed to recognize more than one different packet format, and to detect in each format a code indicating that cryptographic processing is required. Parsing also includes determining the starting point in the packet at which cryptographic processing is to begin. Cryptographic processing may, for example, include encrypting a designated portion of the data frame in accordance with the Data Encryption Standard, or computing a frame check sequence (or checksum), referred to as an integrity check value (ICV), to append to the data packet, or both.

The transmit parser 30 determines which packets that are inbound from the network side are to be cryptographically processed. The parsing function is again one of scanning through data frame header information and making the determination based on this header information. If cryptographic processing is required for an inbound packet, an appropriate portion of the packet is diverted through the cryptographic engine 22. Processing of inbound packets usually involves decryption, or simply recomputation of the frame check sequence to ensure the integrity of the data.

It will be appreciated from the foregoing that the present invention represents a significant advance in the field of cryptographic processing for network communication. In particular, the invention provides a less complex approach to cryptographic processing of message traffic passing between a network and a client device, using a single cryptographic engine, but without introducing additional latency, and without affecting processing throughput. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A method for cryptographic processing of data outbound from a half-duplex client interface to a communication network, and inbound from the communication network to the client interface, using only a single cryptographic engine, the method comprising the steps of:

parsing to determine whether each outbound data packet received from the client interface must be cryptographically processed;

cryptographically processing, if necessary as determined in the preceding step, outbound data packets as they are received from the client interface;

parsing to determine whether each inbound data packet to be transmitted onto the client interface must be cryptographically processed;

cryptographically processing, if necessary as determined in the preceding step, inbound data packets as they are transmitted onto the client interface; and storing inbound and outbound data packets in temporary buffer storage, as needed, before forwarding;

whereby only a single cryptographic engine is needed because the client interface cannot handle an outbound packet and an inbound packet at the same time.

2. A method as defined in claim 1, wherein the step of storing inbound and outbound packets in temporary buffer storage includes:

storing inbound packets if the client interface is unavailable; and storing outbound packets if the communication network is unavailable.

3. A method as defined in claim 2, and further comprising the steps of:

receiving a loopback packet from the client interface;

immediately parsing and cryptographically processing the loopback packet, if necessary; and storing the loopback packet if the client interface is unavailable.

4. A method for cryptographic processing of data outbound from a half-duplex client interface to a communication network, and inbound from the communication network to the client interface, using only a single cryptographic engine, the method comprising the steps of:

receiving inbound data packets from a communication network;

determining for each received packet whether a client interface is available;

if the client interface is unavailable, storing the inbound data packet until the client interface becomes available, then retrieving the packet;

parsing the packet to determine whether it should be cryptographically processed, cryptographically processing the data packet if necessary, and transmitting the packet onto the client interface;

receiving outbound data packets from the client interface;

parsing each packet as it is received from the client interface;

cryptographically processing each packet received from the client interface if processing is determined to be necessary by the preceding parsing step;

determining whether the communication network is available;

if the communication network is unavailable, storing the each outbound data packet until the communication network becomes available, then retrieving the outbound data packet; and transmitting the outbound data packet onto the communication network;

whereby a single cryptographic engine is sufficient to perform the steps of cryptographically processing the data, because cryptographic processing of outbound packets is performed as the packets are received from the client interface, and processing of inbound packets is performed as the packets are transmitted to the client interface, but half-duplex operation of the client interface precludes the possibility of both these functions occurring at the same time.

5. A method as defined in claim 4, and further comprising the steps of:

receiving a loopback packet from the client interface;

immediately parsing and cryptographically processing the loopback packet, if parsing determines that such processing is necessary; and storing the loopback packet if the client interface in unavailable.

6. A method as defined in claim 4, and further comprising, prior to transmitting a packet onto the client interface, the steps of:

parsing a portion of the packet before the client interface becomes available;

storing the parsed portion of the packet in a first-in-first-out buffer, to be ready to transmit;

retrieving data from the first-in-first-out buffer when the client interface becomes available; and beginning transmission of the retrieved data onto the client interface while additional data of the same packet is stored and retrieved in the first-in-first-out buffer.

7. Apparatus for cryptographic processing of data packets outbound from a half-duplex client interface to a communication network, and inbound from the communication network to the client interface, using only a single cryptographic engine, the apparatus comprising:

means for parsing each outbound data packet to determine whether cryptographic processing is necessary and the type of processing to be performed;

means for parsing each inbound data packet to determined whether processing is necessary and the type of processing to be performed;

a single cryptographic engine, for cryptographically processing, if necessary, outbound data packets as they are received from the client interface and, if necessary, inbound data packets as they are transmitted onto the client interface; and buffer storage means for storing, as needed, inbound and outbound data packets before forwarding;

whereby only a single cryptographic engine is needed because the client interface cannot handle an outbound packet and an inbound packet at the same time.

8. Apparatus as defined in claim 7, wherein the buffer storage means includes:

means for storing inbound packets if the client interface is unavailable; and means for storing outbound packets if the communication network is unavailable.

9. Apparatus as defined in claim 8, and further comprising;

means for storing a loopback data packet received from the client interface and cryptographically processed as needed in the cryptographic engine, until the client interface is available.

10. Apparatus for cryptographic processing of data packets outbound from a half-duplex client interface to a communication network, and inbound from the communication network to the client interface, using only a single cryptographic engine, the apparatus comprising:

means for receiving inbound data packets from a communication network;

means for determining whether the client interface is available;

means for storing each inbound data packet if the client interface is unavailable;

means operable when the client interface becomes available, for retrieving a stored data packet;

means for parsing each inbound packet to determine whether it should be cryptographically processed;

a cryptographic engine, operable to cryptographically process the inbound data packet if necessary as determined by the means for parsing each inbound packet;

means for transmitting the inbound data packet onto the client interface;

means for receiving outbound data packets from the client interface;

means for parsing each outbound data packet as it is received from the client interface, and for forwarding each packet for processing in the cryptographic engine, if necessary;

means for determining whether the communication network is available;

means for storing each outbound data packet if the communicating network is unavailable;

means operable when the communication network becomes available, for retrieving a stored data packet and transmitting it onto the communication network;

whereby a single cryptographic engine is sufficient to perform cryptographic processing of the data, because cryptographic processing of outbound packets is performed as the packets are received from the client interface, and processing of inbound packets is performed as the packets are transmitted to the client interface, but half-duplex operation of the client interface precludes the possibility of both these functions occurring at the same time.

11. Apparatus as defined in claim 10, and further comprising:

means for storing a loopback data packet;

and wherein the means for receiving and parsing outbound packets also serve to receive and parse loopback packets as received from the client interface, and the cryptographic engine also serves to cryptographically process loopback packets, as necessary.

12. Apparatus as defined in claim 11, and further comprising:

a high-speed data bus providing bidirectional access to the means for storing data packets.

13. Apparatus as defined in claim 10, and further comprising:

a first-in-first-out buffer, for storing a portion of an inbound data packet prior to its transmission onto the client interface;

means for initiating parsing of a portion of the packet before the client interface becomes available, wherein the parsed portion of the packet is stored in the first-in-first-out buffer, to be ready to transmit; and means for retrieving data from the first-in-first-out buffer when the client interface becomes available, and beginning transmission of the retrieved data onto the client interface while additional data of the same packet is stored and retrieved in the first-in-first-out buffer.

* * * * *